United States Patent
Delker et al.

(10) Patent No.: US 12,463,450 B2
(45) Date of Patent: Nov. 4, 2025

(54) BACKUP POWER SUPPLY FOR EMERGENCY COMMUNICATION IN A FULLY DISCHARGED FUEL CELL ELECTRIC VEHICLE

(71) Applicants: Hyundai Motor Company, Seoul (KR); Kia Corporation, Seoul (KR)

(72) Inventors: Victoria Delker, Farmington Hills, MI (US); Amanda Christiana, Ann Arbor, MI (US); John Molnar, Farmington Hills, MI (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 230 days.

(21) Appl. No.: 18/372,963

(22) Filed: Sep. 26, 2023

(65) Prior Publication Data

US 2025/0105656 A1    Mar. 27, 2025

(51) Int. Cl.
*H02J 9/00* (2006.01)
*B60L 3/00* (2019.01)
*B60L 58/30* (2019.01)
*B60L 50/70* (2019.01)

(52) U.S. Cl.
CPC ............ *H02J 9/002* (2013.01); *B60L 3/0053* (2013.01); *B60L 58/30* (2019.02); *B60L 50/70* (2019.02); *H02J 2310/48* (2020.01)

(58) Field of Classification Search
None
See application file for complete search history.

(56) References Cited

U.S. PATENT DOCUMENTS

| | | | |
|---|---|---|---|
| 6,522,955 B1* | 2/2003 | Colborn | H02J 4/00 700/286 |
| 11,084,412 B1* | 8/2021 | Shultz | H02S 10/10 |
| 2014/0368028 A1* | 12/2014 | Kwon | B60L 3/0053 307/9.1 |
| 2021/0098143 A1* | 4/2021 | Trojer | G21C 5/10 |

FOREIGN PATENT DOCUMENTS

EP              2638593 A1 * 11/2011

* cited by examiner

*Primary Examiner* — Daniel L Greene
(74) *Attorney, Agent, or Firm* — Fox Rothschild LLP

(57) ABSTRACT

Emergency backup power systems for supplying emergency backup power for communication in a fully discharged fuel cell electric vehicle (FCEV), and methods of use, are provided. The emergency backup power system may comprise a first wastewater reservoir configured to store wastewater from a fuel cell state, a second wastewater reservoir configured to store wastewater from one or more water-activated fuel cells, an activation valve configured to enable water to flow from the second wastewater reservoir to the one or more water-activated fuel cells, an actuator configured to open the activation valve, the one or more water-activated fuel cells, a location tracking system configured to determine geographic coordinates of a FCEV, and an emergency communication module, comprising a processor, configured to transmit an emergency communication message for the FCEV.

20 Claims, 7 Drawing Sheets

BACKUP POWER SUPPLY FOR EMERGENCY COMMUNICATION IN A FULLY DISCHARGED FUEL CELL ELECTRIC VEHICLE

BACKGROUND

Technical Field

Embodiments of the present disclosure relate to systems and methods for providing emergency power supply and, in particular, to systems and methods for supplying emergency backup power for communication in a fully discharged fuel cell electric vehicle.

Background

Fuel cell electric vehicles (FCEVs) often run out of fuel (e.g., hydrogen). When this occurs, the driver and passengers of the FCEV are left stranded and unable to summon help.

Example reasons why driver may be unable to summon help include, e.g., the FCEV, being without fuel, cannot generate electricity to call for help since all fuel and battery charge has been exhausted and the FCEV is in a depleted fuel and charge state, and the FCEV may be in a rural or wildness area that has low or no traffic.

Stranded drivers may be stranded for long periods of time without being able to call for rescue. This is a problem for both light duty and commercial vehicle with fuel cells, since FCEVs are often expected to regularly travel long distances, between population centers, often with time sensitive cargo.

Current options for calling for help if a vehicle runs out of fuel include, e.g., accessing roadside assistance through the vehicle itself wherein the vehicle calls for help (e.g., OnStar by GM). This method requires a vehicle that has some electrical charge, at least in a backup battery or accessory battery, and does not work if the vehicle has no charge (e.g., a FCEV with zero charge, including no charge in any accessory or auxiliary batteries) or fuel for producing electricity (e.g., a FCEV without hydrogen). Drivers may also call for help on a personal cellphone (e.g., Hyundai Roadside Assistance). However, this does not work if there is no cellphone coverage, inconsistent cellphone coverage, if the cell phone has no power, or if the driver forgets a cellphone.

SUMMARY

According to an object of the present disclosure, an emergency backup power system is provided. The emergency backup power system may comprise a first wastewater reservoir configured to store wastewater from a fuel cell state, a second wastewater reservoir configured to store wastewater from one or more water-activated fuel cells, an activation valve configured to enable water to flow from the second wastewater reservoir to the one or more water-activated fuel cells, an actuator configured to open the activation valve, the one or more water-activated fuel cells, a location tracking system configured to determine geographic coordinates of a fuel cell electric vehicle (FCEV), and an emergency communication module, comprising a processor, configured to transmit an emergency communication message for the FCEV.

According to an exemplary embodiment, the actuator may comprise an automatic actuator configured to enable automatic opening of the activation valve.

According to an exemplary embodiment, the actuator may comprise a manual actuator configured to enable opening of the activation valve by manual means of a user.

According to an exemplary embodiment, the location tracking system may comprise a global positioning system (GPS) receiver.

According to an exemplary embodiment, the emergency communication module may be configured to generate the emergency communication message.

According to an exemplary embodiment, the second wastewater reservoir may be piped, in series, with the first wastewater reservoir.

According to an exemplary embodiment, the one or more water-activated fuel cells may comprise a bio-enzymatic fuel cell configured to be activated by wastewater from the second wastewater reservoir.

According to an exemplary embodiment, the one or more the water-activated fuel cells may be configured to power the location tacking system and the emergency communication module.

According to an exemplary embodiment, the emergency communication module may be in electronic communication with one or more communication networks.

According to an exemplary embodiment, the emergency communication module may be configured to transmit the emergency communication message to one or more response centers via the one or more communication networks, and the emergency communication message may comprise the geographic coordinates of the FCEV and/or a request for assistance.

According to an object of the present disclosure, an emergency backup power system is provided. The emergency backup power system may comprise a first wastewater reservoir configured to store wastewater from a fuel cell state, a second wastewater reservoir configured to store wastewater from one or more water-activated fuel cells, an activation valve configured to enable water to flow from the second wastewater reservoir to the one or more water-activated fuel cells, an actuator configured to open the activation valve, the one or more water-activated fuel cells, and a computing device, comprising a processor and a memory. The computing device may be configured to store programming instructions that, when executed by the processor, cause the processor to determine geographic coordinates of a FCEV, using a location tracking system, and transmit an emergency communication message for the FCEV, using an emergency communication module.

According to an exemplary embodiment, the location tracking system comprises a GPS receiver.

According to an exemplary embodiment, the programming instructions may be further configured to cause the processor to generate the emergency communication message.

According to an exemplary embodiment, the second wastewater reservoir may be piped, in series, with the first wastewater reservoir.

According to an exemplary embodiment, the one or more water-activated fuel cells may comprise a bio-enzymatic fuel cell configured to be activated by wastewater from the second wastewater reservoir.

According to an exemplary embodiment, the one or more the water-activated fuel cells may be configured to power the location tacking system and the emergency communication module.

According to an exemplary embodiment, the computing device may be in electronic communication with one or more communication networks.

According to an exemplary embodiment, the programming instructions may be further configured to cause the processor to transmit the emergency communication message to one or more response centers via the one or more communication networks.

According to an exemplary embodiment, the emergency communication message may comprise the geographic coordinates of the FCEV and/or a request for assistance.

According to an object of the present disclosure, a method for supplying emergency backup power for communication in a fully discharged FCEV is provided. The method may comprise filling a second wastewater reservoir, of an emergency backup power system, with wastewater, wherein the emergency backup power system may comprise a first wastewater reservoir configured to store wastewater from a fuel cell state, the second wastewater reservoir configured to store wastewater from one or more water-activated fuel cells, an activation valve configured to enable water to flow from the second wastewater reservoir to the one or more water-activated fuel cells, an actuator configured to open the activation valve, the one or more water-activated fuel cells, a location tracking system configured to determine geographic coordinates of a FCEV, and an emergency communication module, comprising a processor, configured to transmit an emergency communication message for the FCEV. The method may comprise opening the activation valve, enabling water to flow from the second wastewater reservoir to the one or more water-activated fuel cells, causing the one or more water-activated fuel cells to generate power to power the location tracking system and the emergency communication module, determining the geographic coordinates of the FCEV, using the location tracking system, and transmitting the emergency communication message, using the emergency communication module.

According to an exemplary embodiment, the emergency communication module may be in electronic communication with one or more communication networks, and the emergency communication message may comprise the geographic coordinates of the FCEV and/or a request for assistance.

According to an exemplary embodiment, the method may further comprise transmitting the emergency communication message to one or more response centers via the one or more communication networks, using the emergency communication module.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
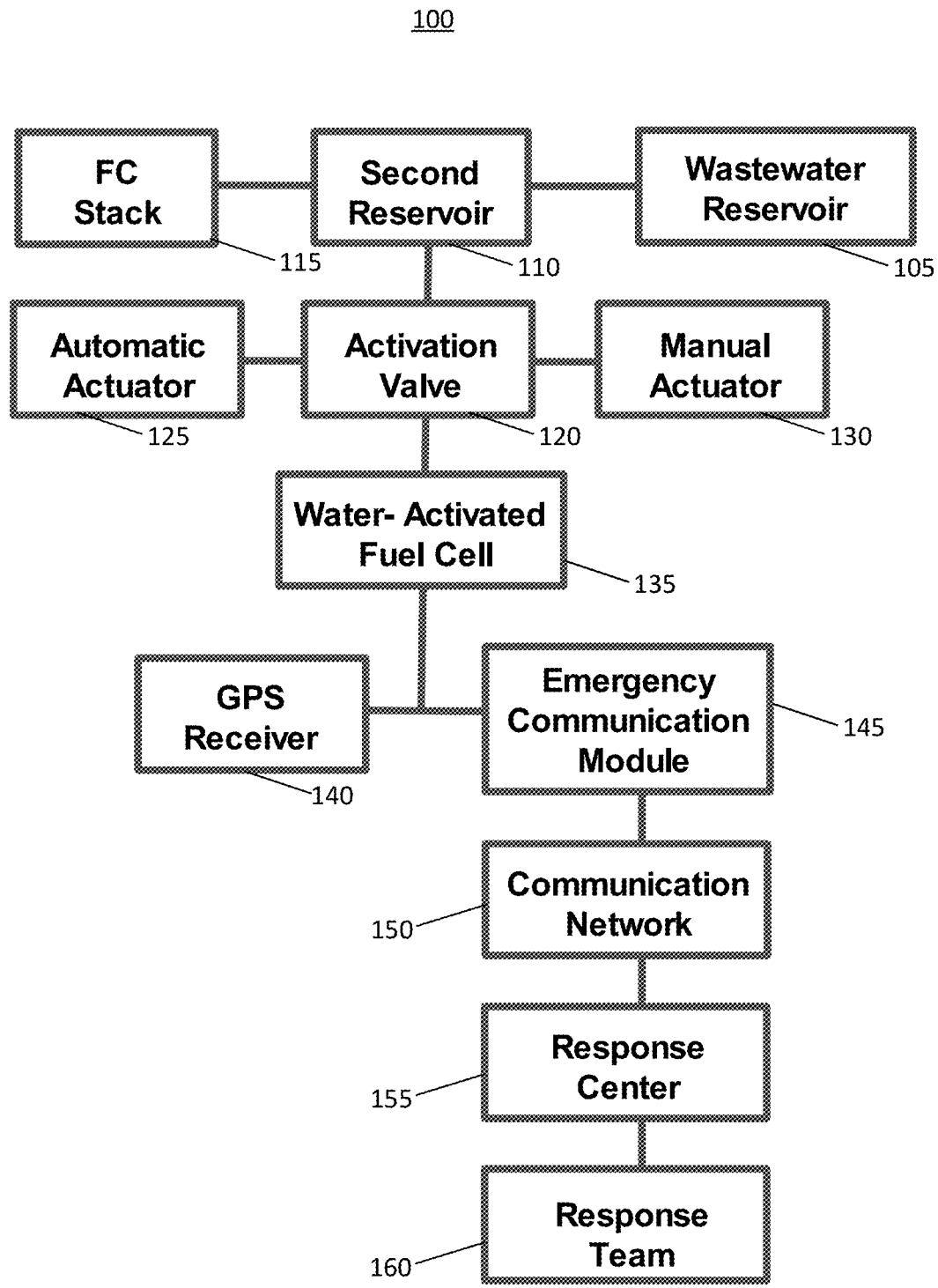
FIG. 1 illustrates an emergency backup power system for supplying emergency backup power for communication in a fully discharged fuel cell electric vehicle (FCEV), according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

Referring now to FIG. 1, an emergency backup power system 100 for supplying emergency backup power for communication in a fully discharged fuel cell electric vehicle (FCEV) is illustratively depicted, in accordance with an exemplary embodiment of the present disclosure.

According to an exemplary embodiment, the emergency backup power system 100 may comprise a wastewater (first) reservoir 105 configured to store wastewater from a fuel cell stack 115, a second wastewater reservoir 110 configured to act as storage for one or more water-activated fuel cells 135, an activation valve 120 configured to enable water to flow from the second reservoir 110 to the one or more water-activated fuel cells 135, an automatic actuator 125 configured to enable automatic opening of the activation valve 120, a manual actuator 130 configured to enable manual means of opening the activation valve 120 (e.g., a level, a pull cable under the hood, and/or other suitable manual means), one or more water-activated fuel cells 135, a location tracking system (e.g., a global positioning system (GPS) receiver 140) configured to provide geographic coordinates of the FCEV, an emergency communication module 145 configured to generate and/or transmit an emergency communication message for the FCEV (e.g., a stranded vehicle), and/or other suitable components. The emergency communication module 145 may comprise a processor and/or a memory.

According to an exemplary embodiment, the second reservoir 110 may be piped, in series, with the wastewater reservoir 105. According to an exemplary embodiment, the activation actuator 125 may comprise a magnetic actuator configured to hold the activation valve 120 closed and configured to enable opening of the activation valve 120 when the magnetic actuator is de-energized.

According to an exemplary embodiment, the one or more water-activated fuel cells 135 may comprise a bio-enzymatic fuel cell configured to be activated by wastewater from the second reservoir 110. According to an exemplary embodiment, the one or more water-activated fuel cells 135 may be configured to power/energize the location tacking system (e.g., the GPS receiver 140) and/or the emergency communication module 145. According to an exemplary embodiment, the water-activated fuel cells 135 may be paper-based biofuel cells configured to use enzymes to turn sugar and oxygen into electricity.

According to an exemplary embodiment, the water-activated fuel cells 135 may require 50 mL of liquid per square centimeter in order to activate. The water-activated fuel cells 135 may configured to be activated several times. The capacity may be approximately 5-10 mW per $cm^3$. However, the capacity is dependent on the discharge profile and other capacities may be implemented while maintaining the spirit and functionality of the present disclosure. The water-activated fuel cells 135 may be paired together in order to increase the capacity and/or may comprise flexible packaging to aid in use for automotive applications.

Figure 3:
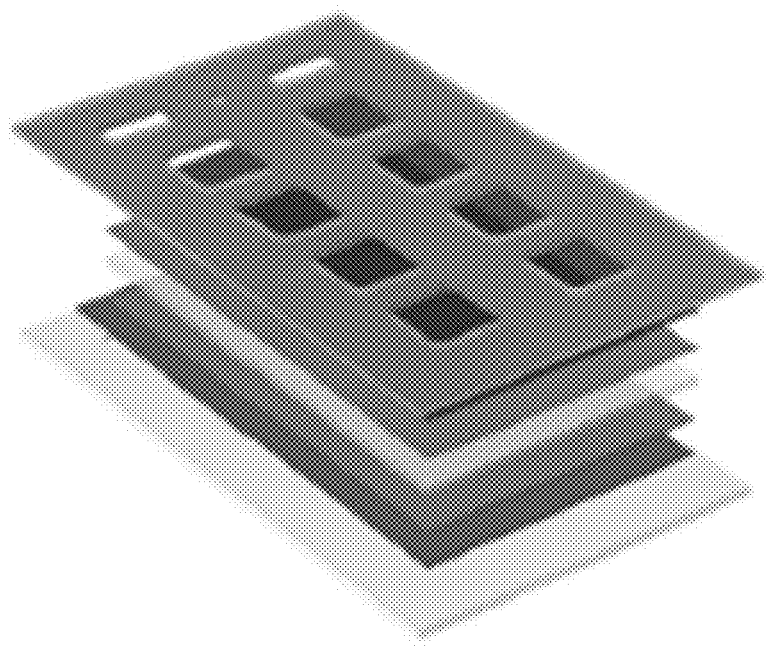
FIG. 3 illustrates a 55 mW fuel cell, according to an exemplary embodiment of the present disclosure.

According to an exemplary embodiment, the paper biofuel water-activated fuel cells 135 may be configured to operate between approximately −20° C. and 65° C., providing a large suitable operating range for automotive applications. A GPS receiver 140 on a typical vehicle model requires approximately 0.3 Amps of power to transmit data, including the vehicle's identification information and location, to an emergency communication module 145 and then to a response center 155. Approximately 65 fuel cells can generate 3600 mW. A fuel cell having 40 $cm^2$, such as shown in FIG. 3, can generate approximately 55 mW of power.

The location tracking system (e.g., the GPS receiver 140) may be configured to save a record of the vehicle's geographic location when connected to a power source. According to an exemplary embodiment, when stacked together, the water-activated fuel cells 135 may be configured to generate enough power to activate the GPS receiver 140 to then send the data necessary to one or more emergency response centers 155.

According to an exemplary embodiment, the emergency communication message may comprise a location (e.g., geographic coordinates) of the FCEV. The emergency communication message may comprise a request for assistance. The emergency communication module 145 may be in electronic communication with one or more communication networks 150. The one or more communication networks 150 may comprise a cellular communication network, a satellite communication, and/or other suitable communication networks. The emergency communication module 145 may be configured to transmit the emergency communication message to one or more response centers 155 via the one or more communication networks 150. The one or more response centers 155 may comprise a human and/or automated center configured to receive the emergency communication message and dispatch a response team 160 to provide assistance to the stranded FCEV.

Figure 4:
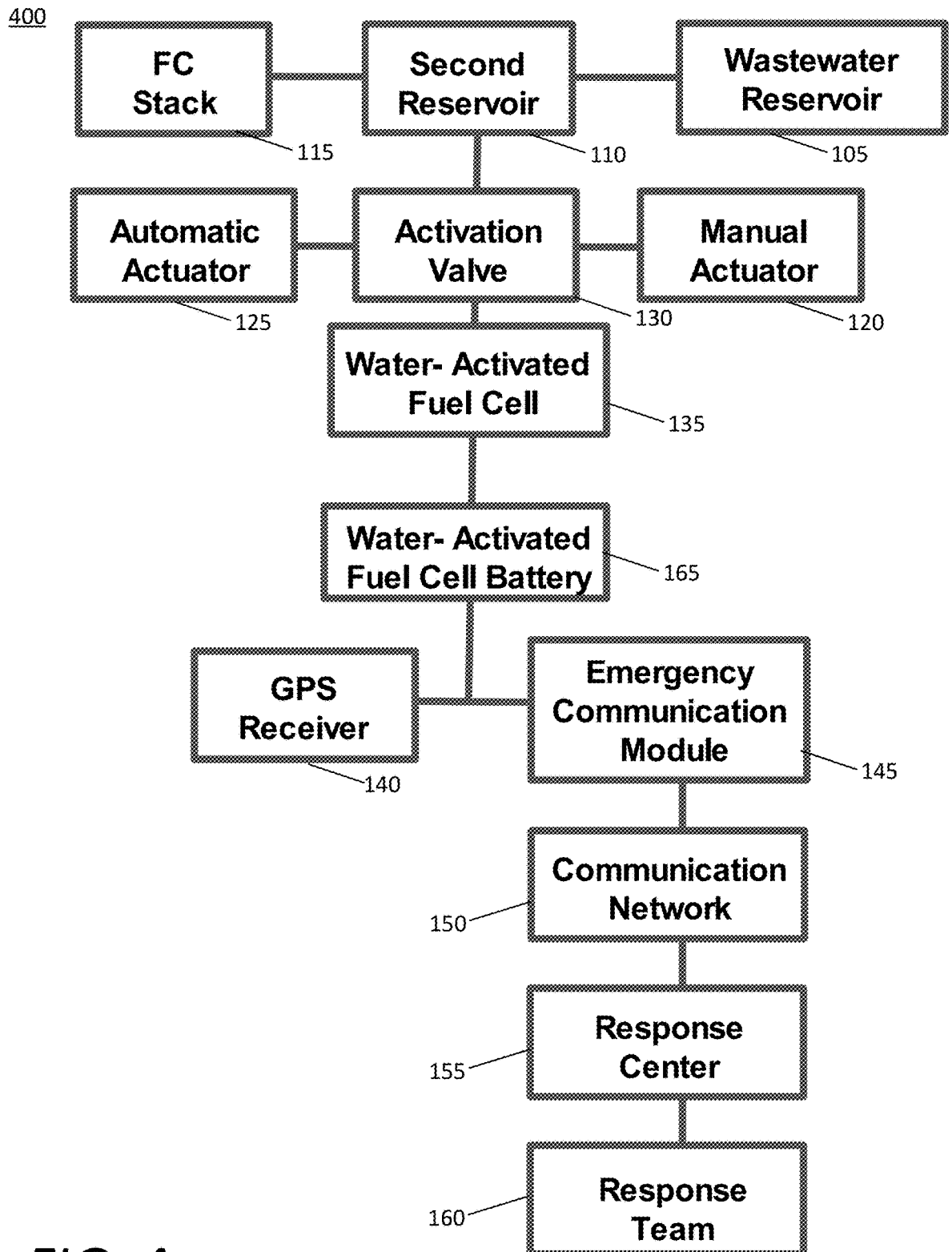
FIG. 4 illustrates an emergency backup power system for supplying emergency backup power for communication in a fully discharged FCEV, according to an exemplary embodiment of the present disclosure.

According to an exemplary embodiment, rather than being configured to transmit a low voltage current from the one or more water-activated fuel cells 135 straight to the GPS receiver 140, a water-activated fuel cell battery may be used, such as the battery 165 shown in emergency backup power system 400, as shown in FIG. 4. According to an exemplary embodiment, the water-activated fuel cell batter 165 may be configured to store power from the one or more water-activated fuel cells 135 until enough power is stored in order to energize the GPS receiver 140 and the emergency communication module 145.

Figure 5:
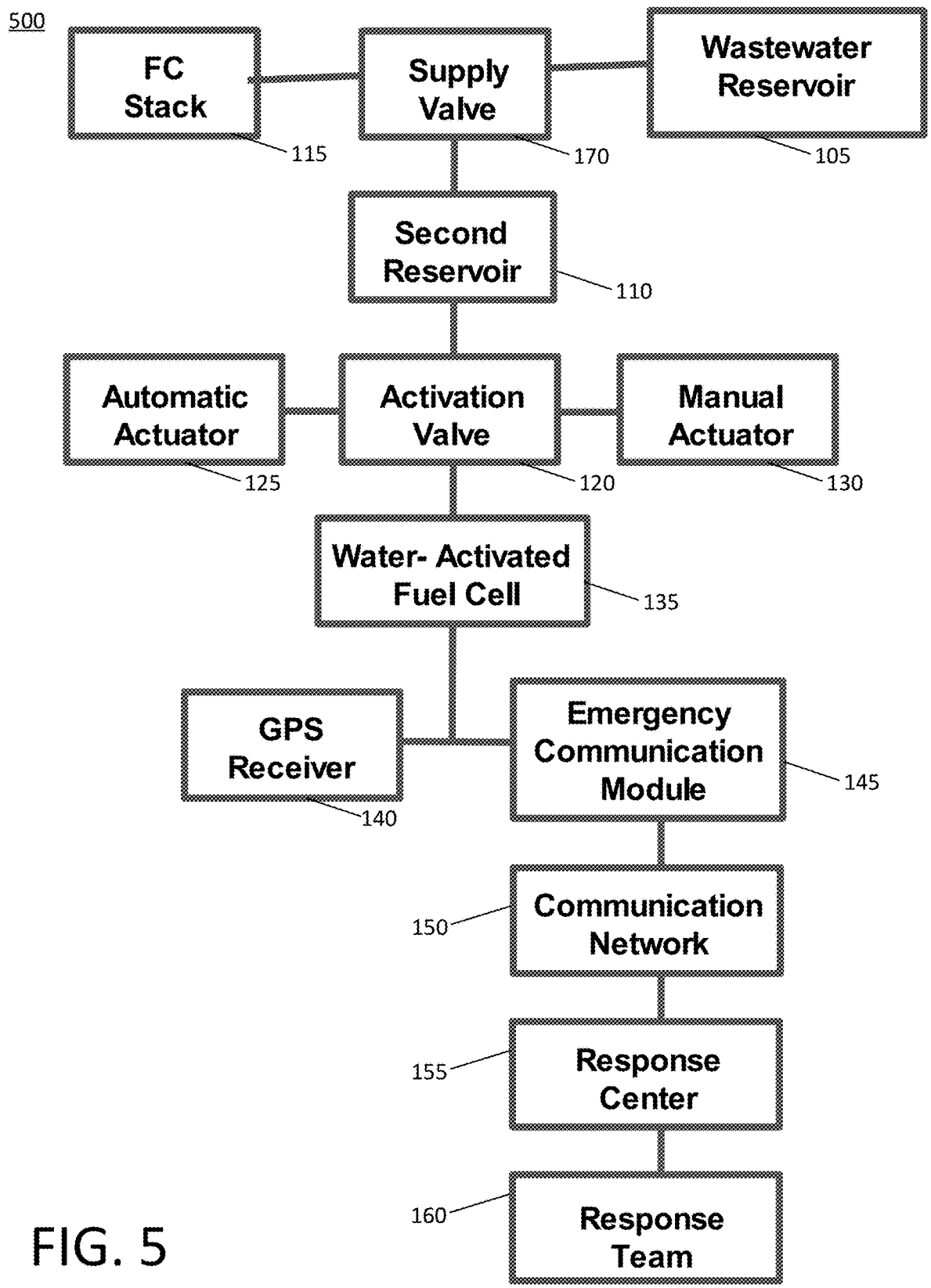
FIG. 5 illustrates an emergency backup power system for supplying emergency backup power for communication in a fully discharged FCEV, according to an exemplary embodiment of the present disclosure.

According to an exemplary embodiment, an emergency backup power system (e.g., emergency backup power system 500, as shown in FIG. 5) may comprise a supply valve 170 configured to carry wastewater to the second reservoir 110 until the second reservoir 110 is full and then divert the wastewater to the wastewater reservoir 105. According to an exemplary embodiment, a floater valve and/or other suitable level-sensing apparatus in the second reservoir 110 may be configured to detect the water levels of the second reservoir 110. When the second reservoir 110 is full, the floater valve may be configured to signal to the supply valve 170 that the second reservoir 110 is full and then the supply valve 170 may be configured to direct wastewater from the fuel cell stack 115 to the wastewater reservoir 105.

Figure 6:
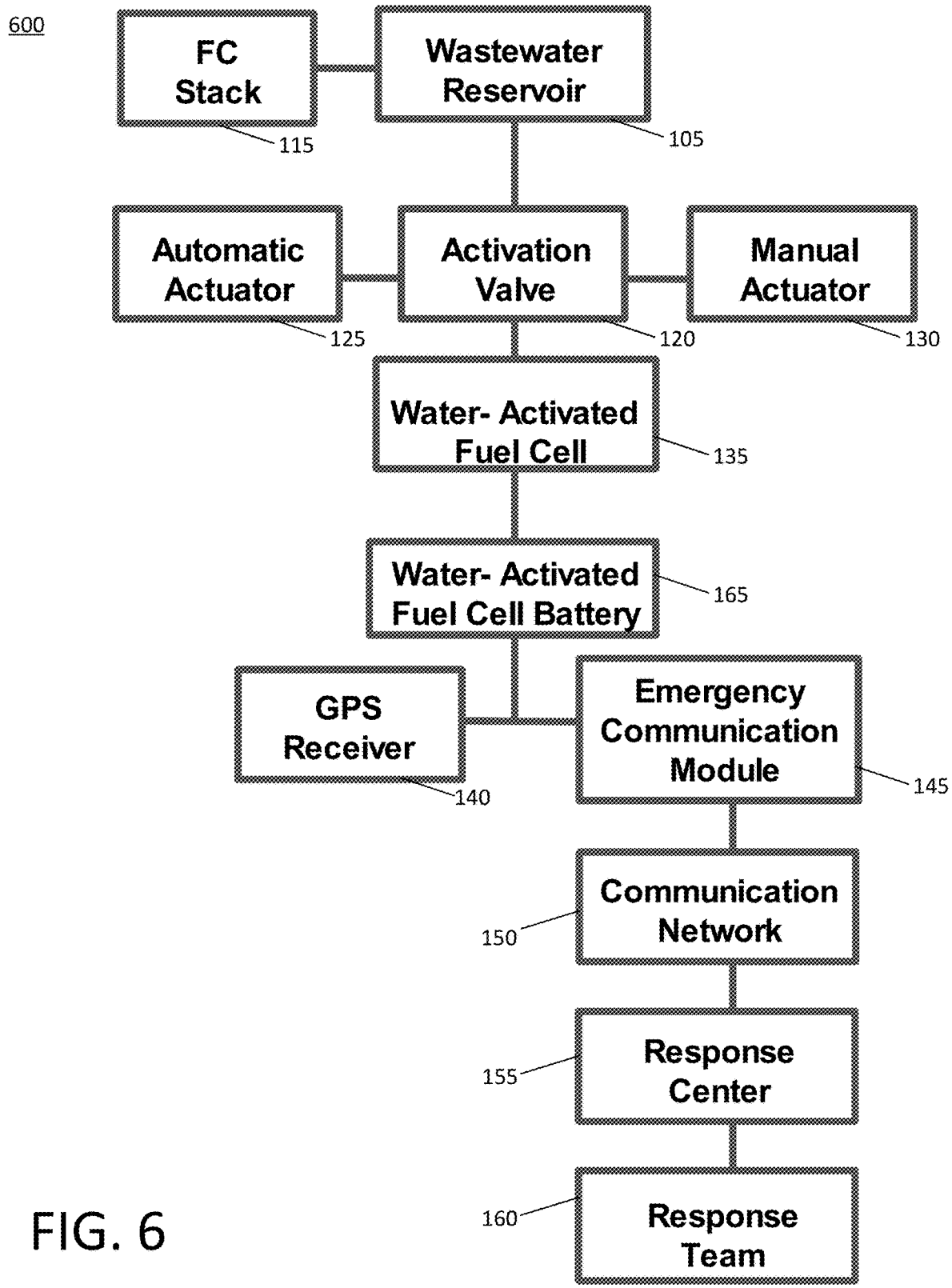
FIG. 6 illustrates an emergency backup power system for supplying emergency backup power for communication in a fully discharged FCEV, according to an exemplary embodiment of the present disclosure.

According to an exemplary embodiment, an emergency backup power system (e.g., emergency backup power system 600, as shown in FIG. 6), rather than using a second reservoir 110 to supply water to activate the one or more water-activated fuel cells 135, may be configured to supply wastewater directly from a water trap using an automatic magnetic actuator or a manual pull cable wherein, in an automatic mode, a magnetic valve is normally held closed and, when power is lost, the magnetic valve opens and supplies water to one or more water-activated fuel cells 135, and, in a manual mode, a lever in the vehicle pulls cable may be configured to open a valve to let water droplets onto the one or more water-activated fuel cells 135.

According to an exemplary embodiment, the emergency backup power system (e.g., emergency backup power system 100, 400, 500, 600) may further comprise a computing device, comprising a processor and a memory, configured to store programming instructions that, when executed by the processor, cause the processor to perform one or more functions of the emergency power backup system.

Figure 2:
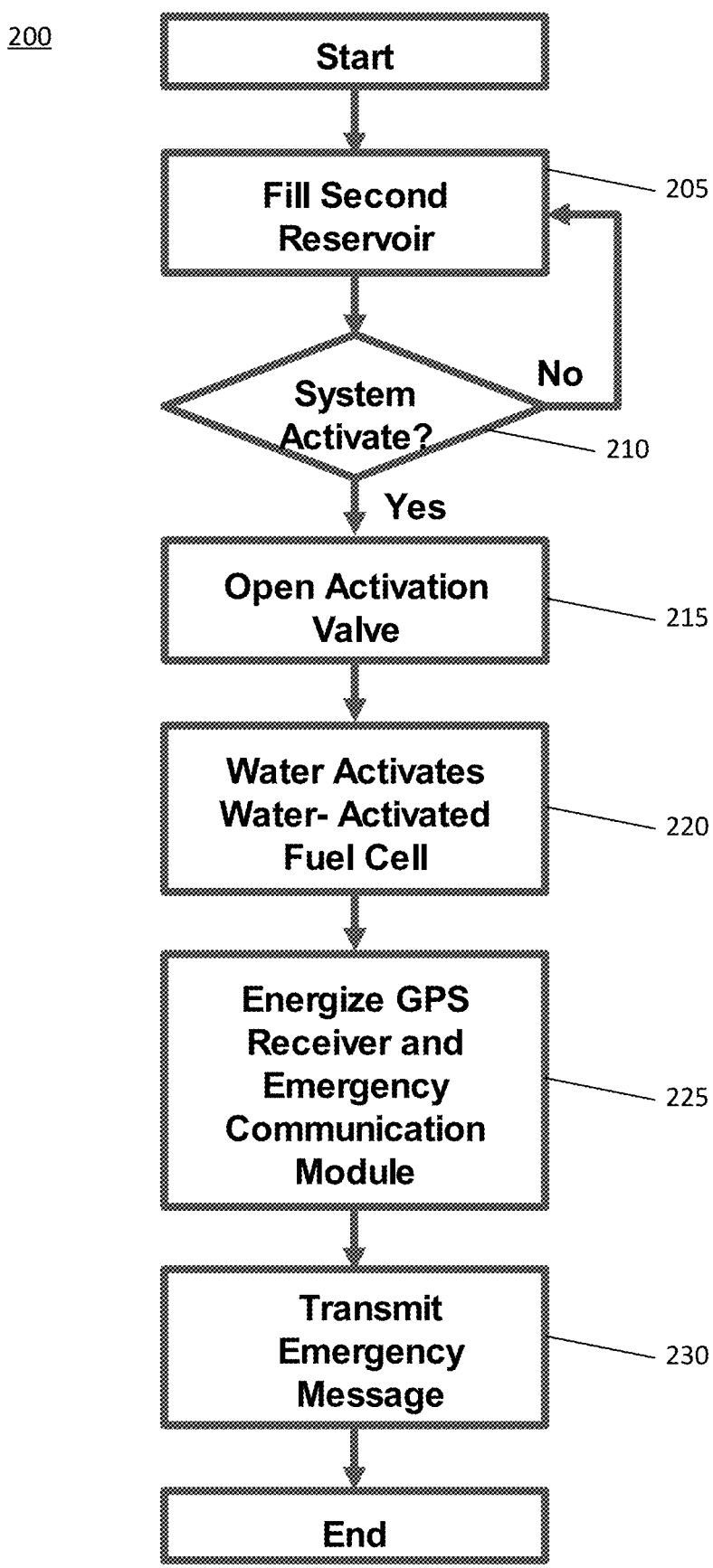
FIG. 2 illustrates a method for supplying emergency backup power for communication in a fully discharged FCEV, according to an exemplary embodiment of the present disclosure.

Referring now to FIG. 2, a method 200 for supplying emergency backup power for communication in a fully discharged FCEV is illustratively depicted, in accordance with an exemplary embodiment of the present disclosure.

According to an exemplary embodiment, a vehicle may comprise a first wastewater reservoir and a secondary or second reservoir. At 205, the second reservoir is filled with fuel cell wastewater. According to an exemplary embodiment, the second reservoir is maintained full.

The second reservoir may be piped in series with the first wastewater reservoir (i.e., a fuel line water trap). The wastewater may first fill the second reservoir and, when the second reservoir is full, overflow from the second reservoir may be configured to flow to the first wastewater reservoir. According to an exemplary embodiment, overflow from the second reservoir may be gravity fed to the first wastewater reservoir. According to an exemplary embodiment, a pump may be used to feed the overflow wastewater to the first wastewater reservoir. According to an exemplary embodiment, the second reservoir fills before any wastewater is discharged or otherwise lost via the first wastewater reservoir.

At 210, it is determined whether an emergency backup power system (e.g., emergency backup power system 100 of FIG. 1) is activated. The system may be activated by a user (e.g., a driver) in a manual mode, may be activated in response to a detection of a depleted charge state of a FCEV in an automatic mode, and/or though other suitable means.

According to an exemplary embodiment, if the system is not activated, then, at 205, the second reservoir is filled.

According to an exemplary embodiment, if the system is activated, then, at 225, an activation valve may be opened, allowing wastewater to flow to a water-activated fuel cell. According to an exemplary embodiment, the system automatically activates when the vehicle has zero power from fuel cells and no charge from any accessory or auxiliary batteries. An electromagnetic actuator may be configured to operate the activation valve.

When energized, the electromagnetic actuator may be configured to actively hold the activation valve closed. With the activation valve closed, wastewater cannot flow from second reservoir to the one or more water-activated fuel cells, and the one or more water-activated fuel cells are not activated.

When de-energized, the electromagnetic actuator may be configured to allow the activation valve to open. With the activation valve open, water flows from the second reservoir to the one or more water-activated fuel cells, and the water-activated fuel cells are activated.

When the vehicle has zero fuel cell power, the electromagnetic actuator may be configured to de-energize, causing the activation valve to open.

According to an exemplary embodiment, the system may be configured to be manually activated by a user (e.g., driver). According to an exemplary embodiment, for manual activation, the system may be configured such that a driver may manually open the activation valve. For example, the system may be configured such that manual activation may occur via a pull cable positioned within the vehicle (e.g., under the vehicle hood).

At 230, the wastewater activates the water-activated fuel cell. According to an exemplary embodiment, the valve allowing wastewater to flow to the water-activated fuel cell may be opened manually by a user (e.g., driver), automatically, wherein an energized electromagnet may be configured to hold the valve closed, and/or through other suitable means. According to an exemplary embodiment, when the FCEV is in a depleted charge state, the electromagnet de-energizes and the valve opens, automatically opening the valve.

At 235, the water-activated fuel cell energizes a location tracking system (e.g., a GPS receiver) and generates an emergency communication message which, at 240, is transmitted. According to an exemplary embodiment, the location tracking system may be configured to determine a geographic location of the FCEV. The emergency communication message may comprise a location (e.g., geographic coordinates) of the FCEV. The emergency communication message may comprise a request for assistance.

Figure 7:
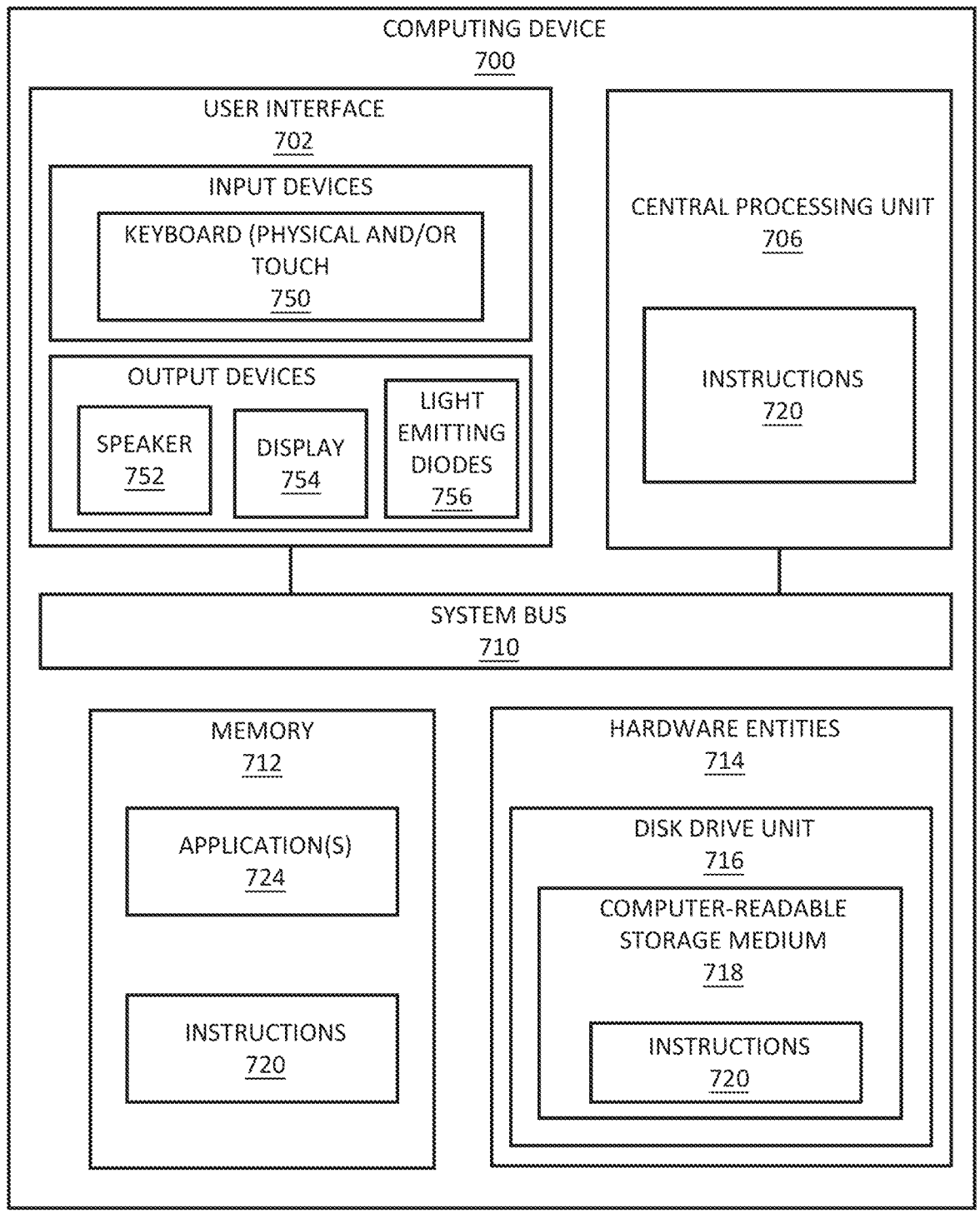
FIG. 7 illustrates example elements of a computing device, according to an exemplary embodiment of the present disclosure.

Referring now to FIG. 7, an illustration of an example architecture for a computing device 700 is provided. According to an exemplary embodiment, one or more functions of the systems 100, 400, 500, 600 of the present disclosure may be implemented by a computing device such as, e.g., computing device 700 or a computing device similar to computing device 700.

Computing device 700 may comprise more or less components than those shown in FIGS. 1-6. The hardware architecture of FIG. 7 represents one example implementation of a representative computing device configured to one or more methods and means for supplying emergency backup power for communication in a fully discharged FCEV, as described herein. As such, the computing device 700 of FIG. 7 implements at least a portion of the method(s) (e.g., method 200) described herein.

Some or all components of the computing device 700 may be implemented as hardware, software, and/or a combination of hardware and software. The hardware may comprise, but is not limited to, one or more electronic circuits. The electronic circuits may comprise, but are not limited to, passive components (e.g., resistors and capacitors) and/or active components (e.g., amplifiers and/or microprocessors). The passive and/or active components may be adapted to, arranged to, and/or programmed to perform one or more of the methodologies, procedures, or functions described herein.

As shown in FIG. 7, the computing device 700 may comprise a user interface 702, a Central Processing Unit ("CPU") 706, a system bus 710, a memory 712 connected to and accessible by other portions of computing device 700 through system bus 710, and hardware entities 714 connected to system bus 710. The user interface may comprise input devices and output devices, which may be configured to facilitate user-software interactions for controlling operations of the computing device 700. The input devices may comprise, but are not limited to, a physical and/or touch keyboard 750. The input devices may be connected to the computing device 700 via a wired or wireless connection (e.g., a Bluetooth® connection). The output devices may comprise, but are not limited to, a speaker 752, a display 754, and/or light emitting diodes 756.

At least some of the hardware entities 714 may be configured to perform actions involving access to and use of memory 712, which may be a Random Access Memory (RAM), a disk driver and/or a Compact Disc Read Only Memory (CD-ROM), among other suitable memory types. Hardware entities 714 may comprise a disk drive unit 716 comprising a computer-readable storage medium 718 on which may be stored one or more sets of instructions 720 (e.g., programming instructions such as, but not limited to, software code) configured to implement one or more of the methodologies, procedures, or functions described herein. The instructions 720 may also reside, completely or at least partially, within the memory 712 and/or within the CPU 706 during execution thereof by the computing device 700.

The memory 712 and the CPU 706 may also constitute machine-readable media. The term "machine-readable media", as used here, refers to a single medium or multiple media (e.g., a centralized or distributed database, and/or associated caches and servers) that store the one or more sets of instructions 720. The term "machine-readable media", as used here, also refers to any medium that is capable of storing, encoding or carrying a set of instructions 720 for execution by the computing device 700 and that cause the computing device 700 to perform any one or more of the methodologies of the present disclosure.

The above description is merely illustrative of the technical spirit of the present disclosure, and those skilled in the art to which the present disclosure belongs may make various modifications and changes without departing from the essential features of the present disclosure.

Although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Thus, the embodiments disclosed in the present disclosure are not intended to limit the technology spirit of the present disclosure, but are intended to describe the present disclosure, and the scope of the technical spirit of the present disclosure is not limited by these embodiments. The scope of protection of the present disclosure should be interpreted by the appended claims, and all technical spirits within the scope equivalent thereto should be interpreted as being included in the scope of the present disclosure.

What is claimed is:

1. An emergency backup power system, comprising:
a first wastewater reservoir configured to store wastewater from a fuel cell state;
a second wastewater reservoir configured to store wastewater from one or more water-activated fuel cells;
an activation valve configured to enable water to flow from the second wastewater reservoir to the one or more water-activated fuel cells;
an actuator configured to open the activation valve;
a location tracking system configured to determine geographic coordinates of a fuel cell electric vehicle (FCEV); and
an emergency communication module, comprising a processor, configured to transmit an emergency communication message for the FCEV.

2. The emergency backup power system of claim 1, wherein the actuator comprises an automatic actuator configured to enable automatic opening of the activation valve.

3. The emergency backup power system of claim 1, wherein the actuator comprises a manual actuator configured to enable opening of the activation valve by manual means of a user.

4. The emergency backup power system of claim 1, wherein the location tracking system comprises a global positioning system (GPS) receiver.

5. The emergency backup power system of claim 1, wherein the emergency communication module is configured to generate the emergency communication message.

6. The emergency backup power system of claim 1, wherein the second wastewater reservoir is piped, in series, with the first wastewater reservoir.

7. The emergency backup power system of claim 1, wherein the one or more water-activated fuel cells comprise a bio-enzymatic fuel cell configured to be activated by wastewater from the second wastewater reservoir.

8. The emergency backup power system of claim 1, wherein the one or more the water-activated fuel cells are configured to power the location tacking system and the emergency communication module.

9. The emergency backup power system of claim 1, wherein the emergency communication module is in electronic communication with one or more communication networks.

10. The emergency backup power system of claim 9, wherein:
the emergency communication module is configured to transmit the emergency communication message to one or more response centers via the one or more communication networks, and
the emergency communication message comprises:
the geographic coordinates of the FCEV; and
a request for assistance.

11. The emergency backup power system of claim 1, wherein the computing device is in electronic communication with one or more communication networks.

12. The emergency backup power system of claim 11, wherein:
the programming instructions are further configured to cause the processor to transmit the emergency communication message to one or more response centers via the one or more communication networks, and
the emergency communication message comprises:
the geographic coordinates of the FCEV; and
a request for assistance.

13. An emergency backup power system, comprising:
a first wastewater reservoir configured to store wastewater from a fuel cell state;

a second wastewater reservoir configured to store wastewater from one or more water-activated fuel cells;

an activation valve configured to enable water to flow from the second wastewater reservoir to the one or more water-activated fuel cells;

an actuator configured to open the activation valve;

a computing device, comprising a processor and a memory, configured to store programming instructions that, when executed by the processor, cause the processor to:

determine geographic coordinates of a fuel cell electric vehicle (FCEV), using a location tracking system; and transmit an emergency communication message for the FCEV, using an emergency communication module.

14. The emergency backup power system of claim 13, wherein the location tracking system comprises a global positioning system (GPS) receiver.

15. The emergency backup power system of claim 13, wherein the programming instructions are further configured to cause the processor to generate the emergency communication message.

16. The emergency backup power system of claim 13, wherein the second wastewater reservoir is piped, in series, with the first wastewater reservoir.

17. The emergency backup power system of claim 13, wherein the one or more water-activated fuel cells comprise a bio-enzymatic fuel cell configured to be activated by wastewater from the second wastewater reservoir.

18. The emergency backup power system of claim 13, wherein the one or more the water-activated fuel cells are configured to power the location tacking system and the emergency communication module.

19. A method for supplying emergency backup power for communication in a fully discharged fuel cell electric vehicle (FCEV), comprising:

filling a second wastewater reservoir, of an emergency backup power system, with wastewater, wherein the emergency backup power system comprises:

a first wastewater reservoir configured to store wastewater from a fuel cell state;

the second wastewater reservoir configured to store wastewater from one or more water-activated fuel cells;

an activation valve configured to enable water to flow from the second wastewater reservoir to the one or more water-activated fuel cells;

an actuator configured to open the activation valve;

a location tracking system configured to determine geographic coordinates of a FCEV; and an emergency communication module, comprising a processor, configured to transmit an emergency communication message for the FCEV;

opening the activation valve, enabling water to flow from the second wastewater reservoir to the one or more water-activated fuel cells, causing the one or more water-activated fuel cells to generate power to power the location tracking system and the emergency communication module;

determining the geographic coordinates of the FCEV, using the location tracking system; and transmitting the emergency communication message, using the emergency communication module.

20. The method of claim 19, wherein:

the emergency communication module is in electronic communication with one or more communication networks, and the emergency communication message comprises:
the geographic coordinates of the FCEV; and
a request for assistance, and further comprising, transmitting the emergency communication message to one or more response centers via the one or more communication networks, using the emergency communication module.

* * * * *